US012491720B2

(12) United States Patent
Oropesa Fisica et al.

(10) Patent No.: US 12,491,720 B2
(45) Date of Patent: Dec. 9, 2025

(54) MONITORING PRINTING FLUIDS

(71) Applicant: Hewlett-Packard Development Company, L.P., Spring, TX (US)

(72) Inventors: Ana Oropesa Fisica, Sant Cugat del Valles (ES); Dorkaitz Alain Vazquez Fernandez, Sant Cugat del Valles (ES); Alberto Borrego Lebrato, Sant Cugat del Valles (ES); Jennifer M. Korngiebel, San Diego, CA (US); Alvin Zheng-Hui Yu, San Diego, CA (US); Miquel Boleda Busquets, Sant Cugat del Valles (ES); Ryan Suelzle, San Diego, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 164 days.

(21) Appl. No.: 18/553,160

(22) PCT Filed: Mar. 29, 2021

(86) PCT No.: PCT/US2021/024568

§ 371 (c)(1),
(2) Date: Sep. 28, 2023

(87) PCT Pub. No.: WO2022/211774

PCT Pub. Date: Oct. 6, 2022

(65) Prior Publication Data

US 2024/0181788 A1 Jun. 6, 2024

(51) Int. Cl.

| | |
|---|---|
| ***B41J 2/195*** | (2006.01) |
| ***B41J 2/17*** | (2006.01) |
| ***B41J 2/175*** | (2006.01) |
| ***B41J 29/46*** | (2006.01) |
| ***G06F 3/12*** | (2006.01) |

(52) U.S. Cl.

CPC ............ *B41J 2/195* (2013.01); *B41J 2/1707* (2013.01); *B41J 2/175* (2013.01); *B41J 2/17596* (2013.01); *B41J 29/46* (2013.01); *G06F 3/1296* (2013.01)

(58) Field of Classification Search

CPC . B41J 2/195; B41J 2/1707; B41J 2/175; B41J 2/17596; B41J 29/46; G06F 3/1296

See application file for complete search history.

(56) References Cited

U.S. PATENT DOCUMENTS

| | | | | |
|---|---|---|---|---|
| 5,500,657 | A | 3/1996 | Yauchi et al. | |
| 7,588,308 | B2 | 9/2009 | Ootsuka | |
| 7,690,776 | B2 | 4/2010 | Devore et al. | |
| 8,020,983 | B2 | 9/2011 | Nishimori | |
| 8,506,064 | B2 | 8/2013 | Watanabe | |
| 2014/0240406 | A1* | 8/2014 | LaCaze | B41J 2/17596 347/85 |
| 2019/0105897 | A1* | 4/2019 | Slotto | B41J 2/19 |

(Continued)

*Primary Examiner* — Yaovi M Ameh
(74) *Attorney, Agent, or Firm* — Jordan IP Law, LLC

(57) ABSTRACT

Example implementations provide a controller to determine a printing fluid abnormality associated with an ink supply channel of a printer; the controller comprising: an input to receive a signal output by a pressure sensor; the signal being indicative of ink pressure associated with the ink supply channel, and a monitor to determine from a characteristic of the signal the presence of an abnormality in the printing fluid.

13 Claims, 5 Drawing Sheets

(56) References Cited

U.S. PATENT DOCUMENTS

| | | | | |
|---|---|---|---|---|
| 2019/0143694 | A1* | 5/2019 | Tuset | B41J 2/175 347/22 |
| 2020/0114655 | A1* | 4/2020 | Escudero Gonzalez | B41J 2/17566 |

* cited by examiner

200A

200B

MONITORING PRINTING FLUIDS

BACKGROUND

Inkjet printing can provide a high image quality given the resolution and colours of the ink drops ejected from the printheads. Anomalies associated with the printhead or printing fluid delivery system can reduce image quality. For example, gases, such as air, ejected from a printhead can adversely affect image quality. The gas, e.g., air, may be within the printing system delivery system and eventually be ejected by printhead. Furthermore, the presence of air in the printhead could lead to printhead failure due to ink starvation in which the printhead nozzles have insufficient ink to eject correctly, which is known as a dry fire. Consequently, the energy that would be otherwise used to eject the ink via respective resistors is not transferred to the ink, but may, for example, increase the printhead temperature.

Moreover, the printing fluid delivery system may, in some cases be provided with printing fluids that are not properly mixed, therefore, having different properties to those for which the printing fluid delivery system was designed. These non-mixed printing fluids may also impact image quality and may lead to printhead failure. In some examples, these non-mixed printing fluids may be referred to as enriched printing fluids.

Therefore, printing systems can be provided with monitoring capabilities to identify anomalies in the printing fluid delivery system as may be gas trapped within the ink delivery system or enriched ink that may benefit from further mixing or recirculation as to achieve proper image quality and/or ensure integrity of the printheads.

The present disclosure refers to a controller to monitor a printing fluid associated with a printing fluid supply channel of a printer; the controller comprising:

- an input to receive a pressure signal by a pressure sensor; the signal being indicative of printing fluid pressure associated with the printing fluid supply channel;
- a processing module to determine from a characteristic of the pressure signal a printing fluid abnormality; and
- an alert module for issuing an alert indicative of the printing fluid abnormality.

In an example, the characteristic is associated with one or more than one of: a rate of change of printing fluid pressure with time, a pressurization period, and a predetermined printing fluid pressure threshold, a printing fluid pressure profile of a number of possible printing fluid pressure profiles each associated with a respective printing fluid.

In a further example, the rate of change of printing fluid pressure with time being below a predetermined gradient is indicative of the presence of gas within the printing fluid supply channel and, therefore, the alert corresponds to a presence of gas alert or, in another scenario, the rate of change of ink pressure being is above a further predetermined gradient is indicative of the presence of enriched printing fluid within the ink supply channel and, therefore, the alert corresponds to an enriched printing fluid alert.

As for the controller, it may comprise or has access to a memory comprising a threshold characteristic wherein the controller may compare the characteristic with the threshold characteristic and to determine the printing fluid abnormality based on the comparison.

Also, the controller may comprise a further input to receive an energy-consumption signal of a pump associated to the printing fluid supply channel wherein the processing module may determine, from the characteristic and the energy-consumption signal, the printing fluid abnormality.

The present disclosure also refers to a machine-readable storage storing machine instructions arranged when executed or implemented in a controller to:

- receive a pressure signal derived from a pressure transducer; the pressure signal being associated with a printing fluid pressure within a printing fluid delivery system;
- process the received pressure signal to determine a printing fluid abnormality; and
- issue an alert indicative of the printing fluid abnormality For example, the instructions to process the received pressure signal to determine the printing fluid abnormality may comprise instructions to determine from a gradient (or another feature) of the pressure signal output by the transducer the printing fluid abnormality.

Also, the instructions to process the received pressure signal to determine the printing fluid abnormality may comprise instructions to determine variability of pressure with time, and instructions to determine from the variability of pressure the printing fluid abnormality. In other examples, the instructions to process the received pressure signal to determine the printing fluid abnormality may comprise: instructions to determine a pressure profile of the pressure signal, and instructions to compare the pressure profile of the pressure signal with a predefined pressure profile.

In any of the above-captioned examples, the machine-readable medium may comprise instructions arranged to measure a pressure reading associated with the pressure transducer an elapsed period of time from an event.

It is also hereby disclosed a printing system comprising

- a printhead,
- a printing fluid delivery system for transporting printing fluid to the printhead from a printing fluid supply,
- a pressure transducer for determining a printing fluid pressure,
- a controller arranged to determine from an output signal associated with the pressure transducer a printing fluid abnormality within the printing fluid delivery system.

In such a system the controller may arranged to process the output signal to determine a characteristic of the output signal and to determine from the characteristic the printing fluid abnormality.

For example, the characteristic may comprise one or more of: a rate of change of printing fluid pressure with time; a pressurization period; a maximum printing fluid pressure; and an ink pressure profile of a number of possible printing fluid pressure profiles each associated with a respective printing fluid.

The system may further comprise a memory comprising a threshold characteristic selected from at least one of: a threshold rate of change of printing fluid pressure with time, a predetermined printing fluid maximum pressure threshold; and an ink pressure profile is stored and wherein the controller is to compare the characteristic with the threshold characteristic and to determine the printing fluid abnormality based on the comparison.

In an example, the system further comprises a pump to maintain a determined printing fluid flow in the printing fluid delivery system wherein the controller is further to receive an energy-consumption signal associated to the pump and wherein the controller is to determine the printing fluid abnormality based on the output signal and the energy-consumption signal Example implementations are described below with reference to the accompanying drawings, in which.

DETAILED DESCRIPTION

Figure 1:
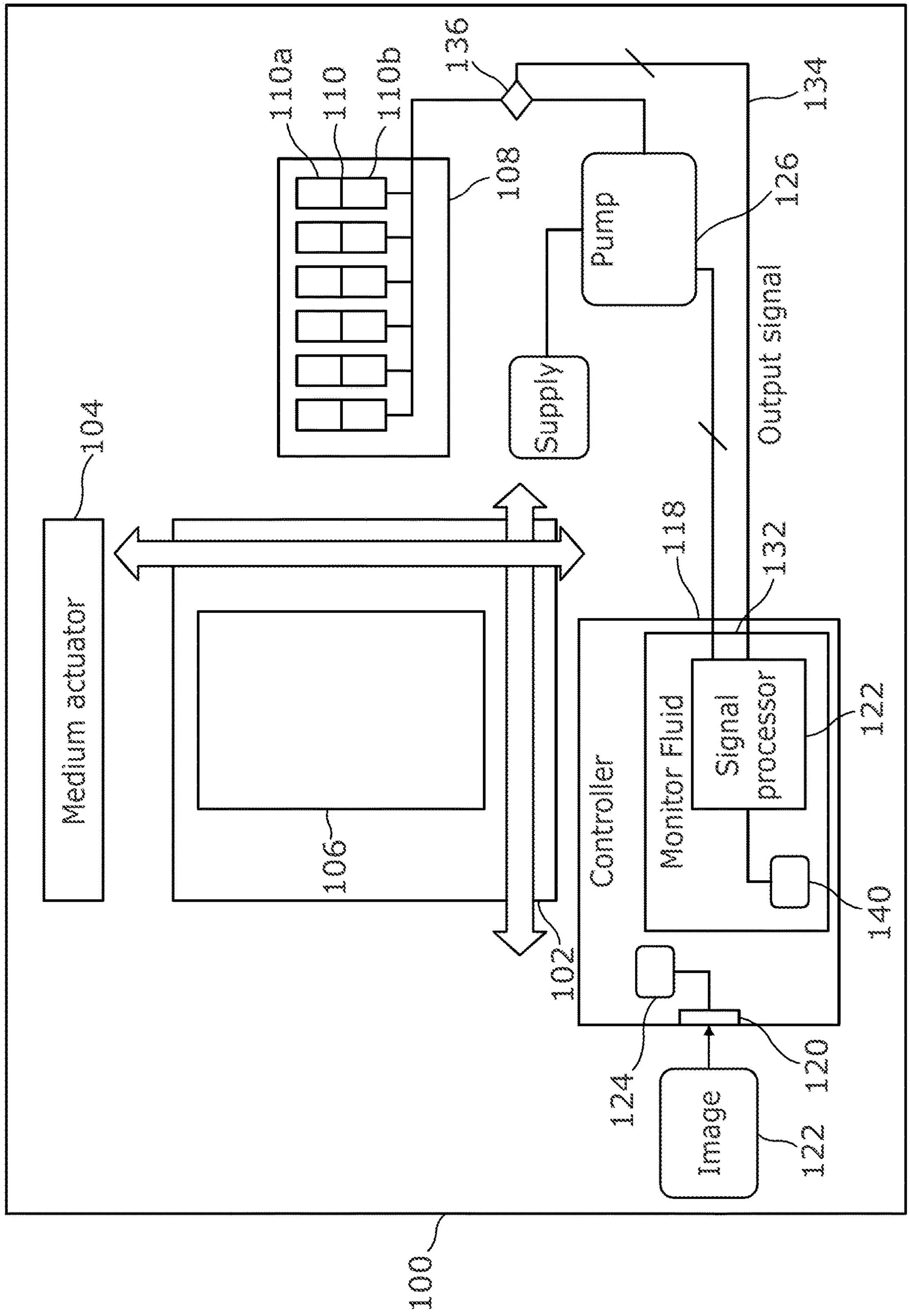
FIG. 1 shows a schematic diagram of a printing system according to some examples.

FIG. 1 illustrates a schematic plan view of a printer 100. The printer 100 comprises: a working area 102 in which a printed plot or drawing can be produced. The working area is an example of a printing region. The printer 100 further comprises a medium actuator 104. The medium actuator 104 moves a medium 106 on which a printing fluid is to be deposited in between print traversals of a printhead carriage 108. A print traversal is a movement of the printhead carriage 108 from one side of the working area 102 to the other side of the working area.

The printhead carriage 108 comprises one or more than one printhead 110 for printing one or more than one printing fluid. A printhead 110 can comprise one or more than one channel 110*a*, 110*b* for receiving and expelling printing fluid during a print traversal. Examples can be realised in which the printhead carriage 108 comprises a number of such printheads 110. The printheads 110 are arranged to deposit respective printing fluids onto the medium 106. The one or more than one printing fluids can comprise one or more printing fluids associated with a respective colour process. Such a colour process can comprise a single tone or multiple tones. For example, a six-colour process, involving magenta, yellow, cyan, red and two blacks, can be used. Similarly, a nine-colour process could be used. In the example shown, each printhead 110 comprises two channels 110*a*, 110*b* for printing fluid. The example implementation shown uses a six-colour process with the colours being ejected from respective channels 110*a*, 110*b* of the three printheads 110. Examples can be realised in which a nine-colour process can be accommodated via 5 printheads. Also, printing fluids include so-called non-marking fluids which may be transparent and improve fixing or durability characteristics on the printed products. Examples of non-marking fluids include fixers and overcoats.

The printhead carriage 108, in this example, is arranged to traverse the working area 102 in a reciprocating manner. While traversing the working area 102, the printheads 110 can print printing fluids onto the medium 106. The printheads can deposit printing fluid onto the medium 106 in either one direction, or both directions, of traversal. The printheads 110 can use an array of nozzles (not shown) to deposit the printing fluids. Depositing the printing fluids can use a thermal technique in which a heating element is arranged to heat the printing fluid rapidly so that printing fluid is ejected from a nozzle orifice associated with the heating element.

A controller 118 is provided for controlling one or more aspects of the printing system 100 and/or printer operations. The printer operations can comprise one or more of printing operations, maintenance operations or other operations.

The controller 118 comprises an input interface 120 for receiving an image 122 to be printed. The controller 118 can control the printing operations used to print the image 122 on the medium 106 via printing control logic 124.

The printer 100 also comprises a printing fluid delivery system which is a sub-system of the printing system. The printing fluid delivery system refers to the fluidic circuit that fluidically connects the supplies 112 to the corresponding printheads 110.

The printing fluid delivery system may comprise multiple printing fluid supply channels in which each supply channel carries a respective printing fluid such as one of the inks and non-marking fluids of any of the above-described colour processes between the supplies 112 and the printhead 110.

The controller 118 comprises logic or circuitry 132 to detect abnormalities in the printing fluids within the printing fluid delivery system and, in particular, in the printing fluid supply channels. The logic or circuitry 132 is an example of a monitor to determine from a characteristic of a pressure profile derived from one or more than one signal a possible abnormality of a printing fluid. The logic or circuitry 132 is responsive to at least one signal 134 from at least one transducer 136. Each transducer or the transducer 136 can be a pressure sensor. Each pressure sensor 136 is arranged to provide an indication of printing fluid pressure in a respective one of the supply channels via respective signals 134. In FIG. 1, a solidus is used to indicate electric signals and differentiate them from the fluid lines in the printing fluid delivery system. Also, it should be noted that the printing fluid delivery system may comprise a plurality of transducers 136, in particular, a transducer for each of the printing fluids.

The logic or circuitry 132 can comprise a signal processor 138 that is arranged to process any pressure signals to determine whether or not they exhibit any characteristic or characteristics indicative of a printing fluid abnormality. If the determination is that a signal exhibits one or more characteristics indicative of a printing fluid having a potential abnormality, an alert 140 to that effect is generated and output by the controller 118. The alert 140 can comprise a message displayed on a screen (not shown) that can be viewed by the user or operator or, in some cases, may be an active alert wherein the operation of the printing fluid delivery system is modified, e.g., modifying the fluid path of the printing fluids by triggering a recirculation process for the relevant printing fluid or stopping the pump 126 associated to the printing fluid for which the abnormality was determined.

In an example, the controller 118 may access an energy-consumption signal 135 of the pump 126. The controller 118 may, therefore, use the energy-consumption signal 135 as an additional data source for determining a printing fluid abnormality. In an example, the controller 118 may analyse for a printing fluid a pressure signal 134 and an energy-consumption signal 135 at a determined time period, then, based on the analysis, the controller 118 may determine a printing fluid abnormality.

Figure 2A:
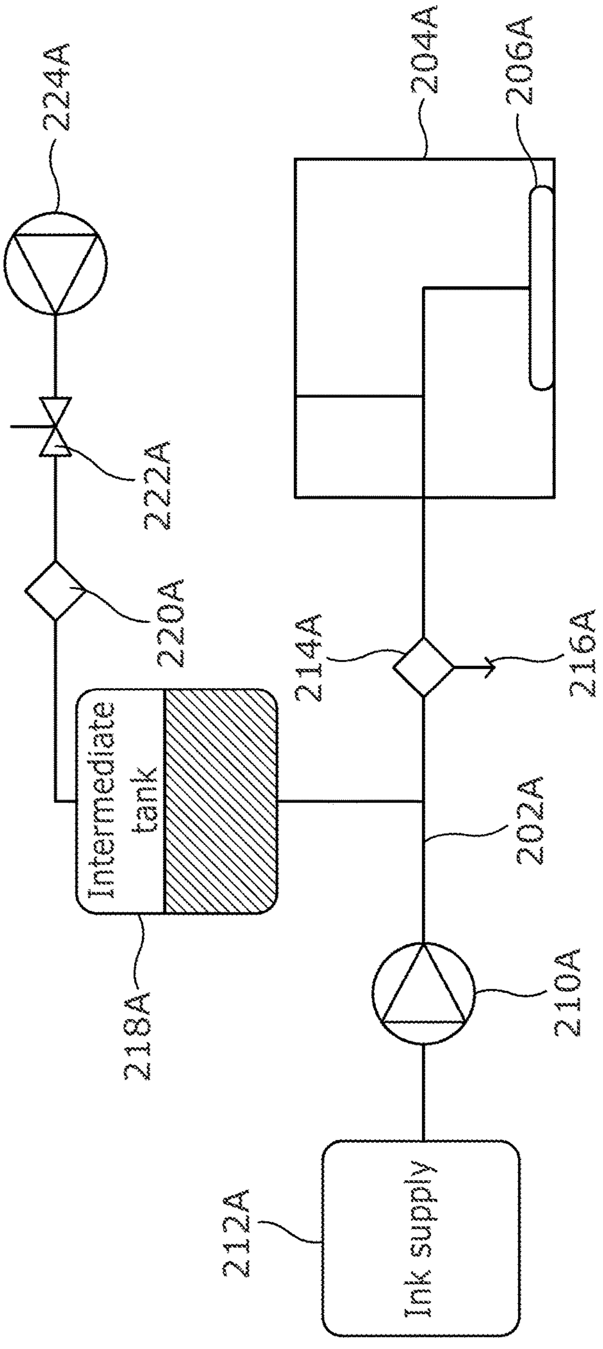
FIGS. 2A and 2B illustrate printing fluid delivery systems according to example implementations.

Referring to FIG. 2A, there is shown a view of a printing fluid delivery system 200A according to an example implementation. The printing fluid system 200A is an example of the above-described printing fluid delivery system 126. The printing fluid delivery system 200A comprises a printing fluid supply channel 202A. The printing fluid supply channel 202A is an example of any of the above-described printing fluid supply channels. The printing fluid supply channel 202A is arranged to supply a printing fluid to a printhead 204A. The printhead 204A is an example of any of the above described printheads 110. The printing fluid supply channel 202A supplies printing fluid to print nozzles 206A of the printhead 204A. The printing fluid supply channel 202A is coupled to a pump 210A. The pump 210A is used to draw printing fluid from a printing fluid supply 212A.

A transducer 214A such as a pressure sensor is arranged within or is fluidically coupled to, or is otherwise influenced by, the pressure of the printing fluid within, the printing fluid supply channel 202A. The transducer 214A is an example of any of the above-described transducer or transducers 136. The transducer 214A is arranged to output a signal 216A, e.g., a pressure signal. The pressure signal 216A is indicative of, or otherwise associated with, the pressure of the printing fluid in the printing fluid supply channel 202A. The pressure signal is an example of any of the above-described signal or signals 134. The controller 118 is arranged to use the pressure signal 216A in determining a printing fluid abnormality in the printing fluid associated to the printing fluid that corresponds to the pressure signal 216A.

Further, the controller may access an energy-consumption signal associated to the pump 210A and based on the pressure signal 216A and the energy-consumption signal of the pump 210A determine a printing fluid abnormality. For example, upon performing an operation in the ink delivery system the pump 210A may be instructed to increase the pressure in the fluid channel 202A if the pressure signal shows a rate of increase that is different than expected (either lower or higher) this may be indicative of an abnormality in the printing fluid. Furthermore, if the controller 118 determines an energy-consumption signal associated to the pump 210A that is different from an expected signal, the controller may more accurately determine the presence of the abnormality in the printing fluid.

The example implementation depicted in FIG. 2A additionally comprises an intermediate tank 218A for storing printing fluid. The intermediate tank 218A is maintained at a preset pressure to ensure correct printing operation. The preset pressure is maintained using a pressure sensor 220A in conjunction with a value 222A and an air pump 224A. The value 222A is used to vent air from the intermediate tank 218A when it is being primed with printing fluid from the printing fluid supply or printing fluid supply 212A in preparation for printing. As the printing fluid level varies during printing the pressure sensor 220A and air pump 224A are responsive to maintain the printing fluid within the intermediate tank 218A at a desired pressure.

Figure 2B:
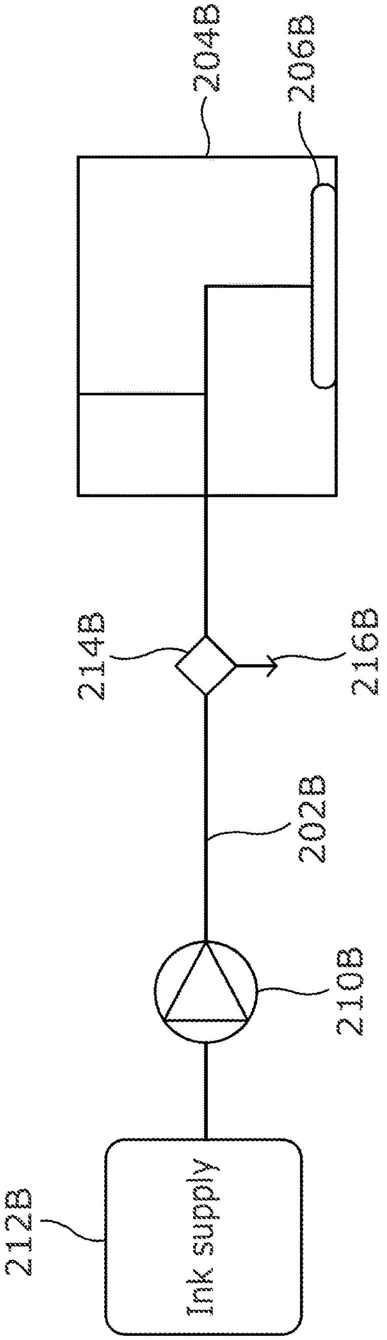

Referring to FIG. 2B, there is shown a view of a further printing fluid delivery system 200B according to an example implementation. The printing fluid delivery system 200B is an example of the above-described printing fluid delivery system 126. The printing fluid delivery system 200B comprises a printing fluid supply channel 202B. The printing fluid supply channel 202B is an example of any of the above-described printing fluid supply channels. The printing fluid supply channel 202B is arranged to supply a printing fluid to a printhead 204B. The printhead 204B is an example of any of the above described printheads 110. The printing fluid supply channel 202B supplies printing fluid to print nozzles 206B of the printhead 204B.

A transducer 214B such as a pressure sensor is arranged within or is fluidically coupled to, or is otherwise influenced by, the pressure of the printing fluid within, the printing fluid supply channel 202B. The transducer 214B is an example of any of the above-described transducer or transducers 136. The transducer 214B is arranged to output a pressure signal 216B. The pressure signal 216B is indicative of, or otherwise associated with, the pressure of the printing fluid in the printing fluid supply channel 202B. The signal is an example of any of the above-described signal or signals 134. The controller 118 is arranged to use the output signal 216B in determining an abnormality on the printing fluid within the printing fluid supply channel 202B.

Figure 3:
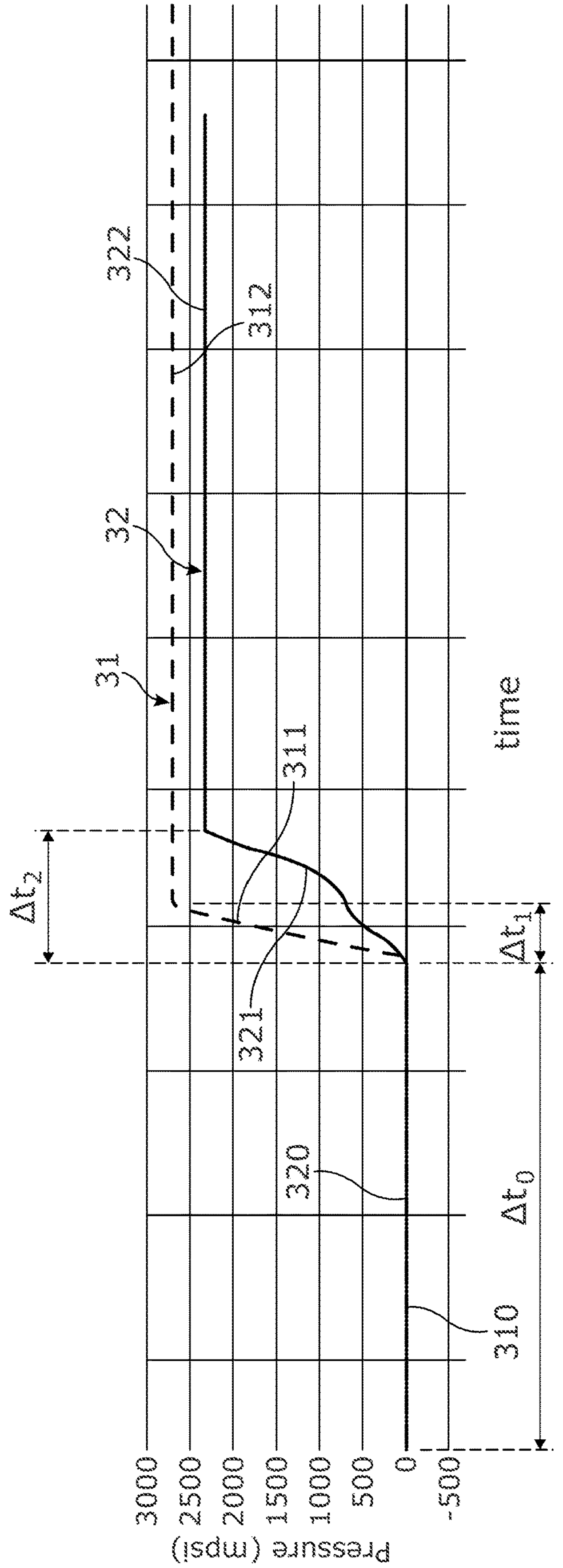
FIG. 3 depicts a graph of variation of printing fluid pressure with time according to some examples.

Referring to FIG. 3, a graph is shown illustrating a first pressure signal 31 and a second pressure signal 32 being the first and second pressure signals examples of types of signals that may be obtained by a transducer 136 of the printing fluid delivery system. The pressure signal 31 is an example of any of the above described signals such as, for example, pressure signal 134 of FIG. 1 from a respective pressure sensor such as, for example, pressure sensor 136 of FIG. 1. The first and second pressure signals 31, 32 are indicative of the printing fluid pressure within a respective printing fluid supply channel.

As shown in FIG. 3, during an idle time period $\Delta t_0$, the fluid channel is not pressurized and, therefore, the pressure signals are stable in the first sections 310, 320 and read 0 mpsi (0 kPa), in the two examples represented by the first pressure signal 31 and the second pressure signal 32 respectively.

Upon receiving a trigger, the pump pressurizes the printing fluid channel and the first pressure 31 read by its associated pressure sensor increases for a first pressurization period $\Delta t_1$ until completely pressurizing the printing fluid channel and arriving to a target pressure 312 at about 2600 mpsi (17.93 kPa). As shown in FIG. 3, for the second pressure 32 read by its associated pressure sensor the pressure increases for a second pressurization period $\Delta t_2$ to a second target pressure 312 of about 2400 mpsi (16.55 kPa) being the second pressurization period $\Delta t_2$ shorter than the first pressurization period $\Delta t_1$.

The controller comprises an input to receive the pressure signals 31, 32 sensed by the corresponding pressure sensor being the pressure signals indicative of printing fluids pressures associated with their respective printing fluid supply channel. The controller also comprises a processing module to determine from a characteristic of the pressure signal a printing fluid abnormality, e.g., the controller may determine from the pressurization period of each of the first and second pressure signals 31, 32 if there is an abnormality in the printing fluid associated to the pressure signal.

Turning back to the example of FIG. 3, the controller may determine that the second pressurization period $\Delta t_2$ is longer than expected and, in consequence, gas bubbles may be present within the printing fluid. In this case, the controller may issue an alert corresponding to an alert indicating the presence of gas in the printing fluid delivery system, in particular, in the fluid channel that corresponds to the second pressure signal 32.

The presence of gas in a printing fluid has the effect that, upon pressurization of the printing fluid channel, due to the lower compressibility of the printing fluid with respect to gases, such as air, the pressure increases at a lower rate. Therefore, the controller may, based on the pressurization period, determine a printing fluid abnormality and, by an alert module, issuing an alert indicative of the printing fluid abnormality. In the present case, the controller may determine that the second pressure 32 corresponds to a printing fluid channel that may have gas bubbles whereas the first pressure 31 corresponds to a channel having no abnormalities in the printing fluid.

More generally, the controller may determine a pressure gradient by at least two measurements and, based on the pressure gradient determine that the rate of change is lower than expected and trigger the presence of gas alert. In the example of FIG. 3, the gradient (or rate of change) of pressure is represented by the slopes 311, 321 of the first and second pressure signals 31, 32, respectively. The presence of a slope 311, 321 at a lower inclination, e.g., than a threshold slope may be indicative of presence of gas within the fluid channel. In the present case, the first slope 311 corresponds to a normal printing fluid and the second slope 321 has a gradient substantially lower than the first slope 311 and, therefore, corresponds to a channel likely to have gas in the printing fluid, e.g., air bubbles.

It can be appreciated that the variation in pressure has at least one characteristic indicative of a printing fluid abnormality. The at least one characteristic can comprise one or more than one of

- a pressurization period,
- a rate of change of printing fluid pressure with time, i.e., a pressure gradient or pressure slope,
- a predetermined ink pressure threshold,
- an ink pressure profile,
- an ink pressure profile associated with a respective printing fluid,
- an printing fluid pressure profile of a number of possible printing fluid pressure profiles each associated with respective printing fluids,
- a spike of pressure,
- a maximum pressure.

Also, the controller may, in an example, comprise or have access to a memory comprising a threshold characteristic wherein the controller is to compare the characteristic obtained from the pressure signal 31, 32 with the threshold characteristic and to determine the printing fluid abnormality based on the comparison. Examples of threshold characteristics may include, as explained above, a threshold pressure, a threshold slope, or a threshold pressurization period.

In an example, the controller may comprise or otherwise access a memory that stores reference pressure profiles associated to different events within a printing fluid supply channel, e.g., a pressurization due to a refill of an intermediate tank. The controller may then, upon receiving a signal indicating that a refill of the intermediate tank is being performed, compare the pressure profile that is being measured by the transducer with a reference pressure profile and, based on the comparison, determining an abnormality of the printing fluid associated to such printing fluid supply channel. In an example, different printing fluids may be associated to different reference pressure profiles, i.e., the reference pressure profile corresponding to a Cyan ink may be different from a reference pressure profile of a Magenta ink or an overcoat as their physical properties may be different.

Figure 4A:
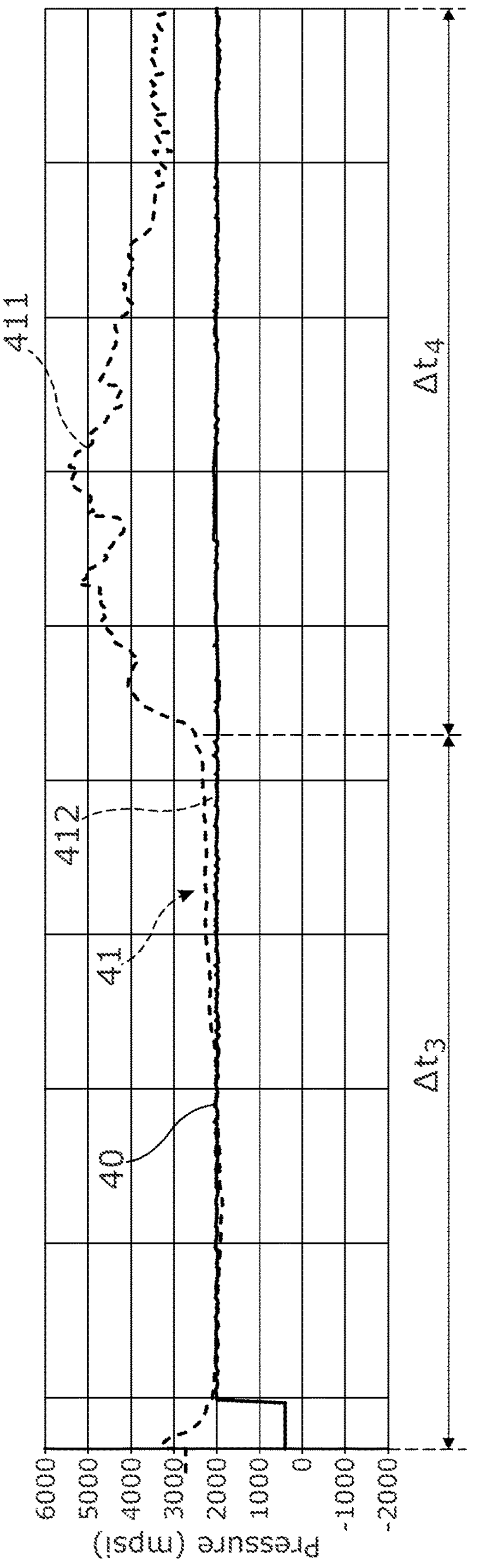
FIG. 4 shows a further graph of variation of printing fluid pressure with time according to some examples.
Figure 4B:
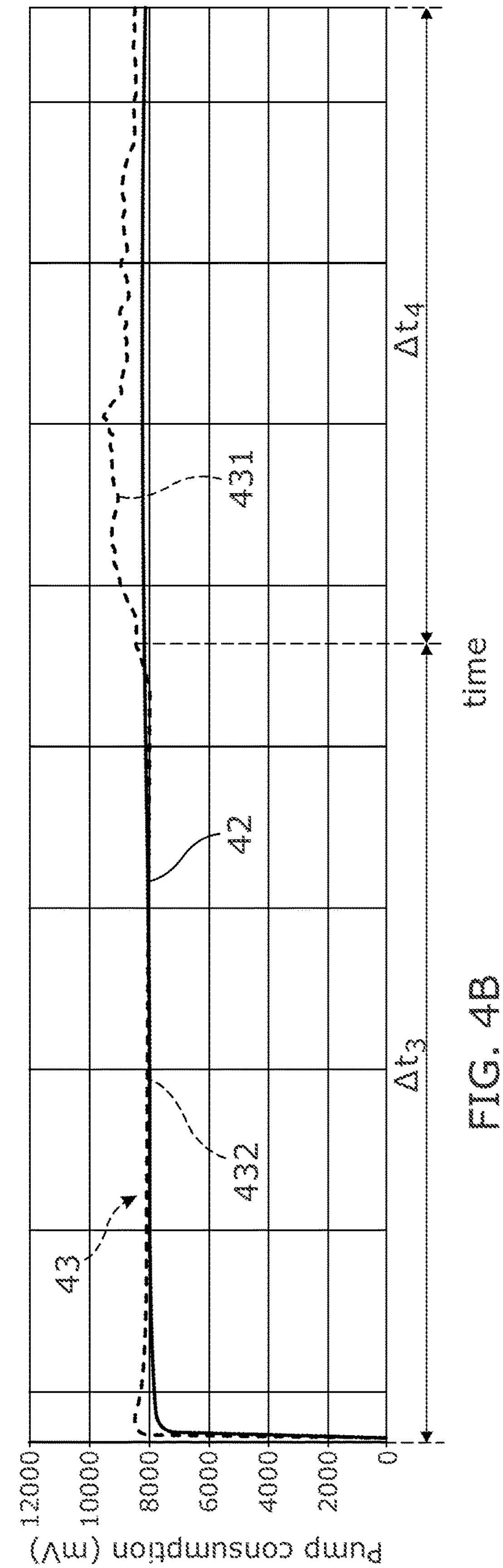

FIGS. 4A and 4B, show other examples of signals that may be obtained by the transducers and that the controller may use to determine a printing fluid abnormality within the printing fluid channel. In particular, FIG. 4A shows pressure signals associated to a printing fluid channel and FIG. 4B shows the pump consumption signals associated to pumps within the printing fluid channel.

In particular, FIG. 4A illustrates a pressure signal 41 wherein the signal comprises two main portions, a first portion 412 that occurs during a stable period $\Delta t_3$ and a second portion 411 that occurs during a non-stable period $\Delta t_4$. Also, a pressure reference signal 40 is shown wherein during both, the stable period and the non-stable period, the pressure reference signal remains around 2000 mpsi (13.79 kPa).

In an example, similar to the case illustrated in FIG. 3, a controller will determine, based on a characteristic of the pressure signal, a printing fluid abnormality, the controller may do so, for example by:

a. Comparing the pressure signal 41 with the reference signal 40 (e.g., stored in a memory). The comparison is the characteristic that allows to determine a printing fluid abnormality.

b. Analysing the pressure signal 41 and, upon determination of a gradient exceeding a threshold value, determining a printing fluid abnormality, e.g., upon reaching the non-stable period $\Delta t_4$, the pressure signal exhibits a gradient (or slope in the signal). In this case the gradient/slope/rate of change in the pressure signal is the characteristic that allows to determine a printing fluid abnormality.

c. Determining that the pressure signal 41 exceed a threshold, which may be a static threshold (e.g., if it exceeds 2100 mpsi (14.48 kPa)) or a dynamic threshold, if the pressure exceeds 10% the pressure during the stable period $\Delta t_3$. In this case, the pressure magnitude is the characteristic that allows to determine a printing fluid abnormality.

In the case of FIG. 4A, the effect determined by the controller is that, while maintaining a constant flow, the pressure readings show a pressure increase in the printing fluid supply channel, the reason for this is that the printing fluid is having some variability in its physical properties and, the most common issue that will increase the pressure in this case would be the presence of enriched printing fluid, e.g., ink with settlements of pigments. This ink is more viscous, and its presence increases the pressure readings. The controller may, in this case, issue an alert signal indicating the presence of enriched printing fluid.

FIG. 4B illustrates pump consumptions signals for a printing fluid delivering system, e.g., according to FIG. 2A or 2B being the pump consumption signals associated to the pressures shown in FIG. 4A.

In an example, the controller may also be provided with a pump consumption signal 43, as in the case of FIG. 4A, the pump consumption signal, during the stable period $\Delta t_3$ remains at a first magnitude whereas, during the instable period $\Delta t_4$ rises and presents a different behaviour. The controller may determine based on both, the pressure signal 41 and the pump consumption signal 43 a printing fluid abnormality. The addition of the pump consumption signal 43 to the analysis aids in having a more accurate measurements and to reduce possible false positives.

As in the case of the pressure signal 41, the pump consumption signal may be compared to a pump consumption reference signal 42. It should also be noted that the pressure reference signal 40 and the pump consumption reference signal 42 may be stored in a memory as threshold profiles so that the controller may use them for comparison. Also, such reference signals may be pre-defined in factory settings, may be determined during a calibration proceeding on the printing system and, in an example, may be re-calibrated during use of the printing system as to accommodate, e.g., wearing or aging of the components of the printing fluid delivery system.

Figure 5:
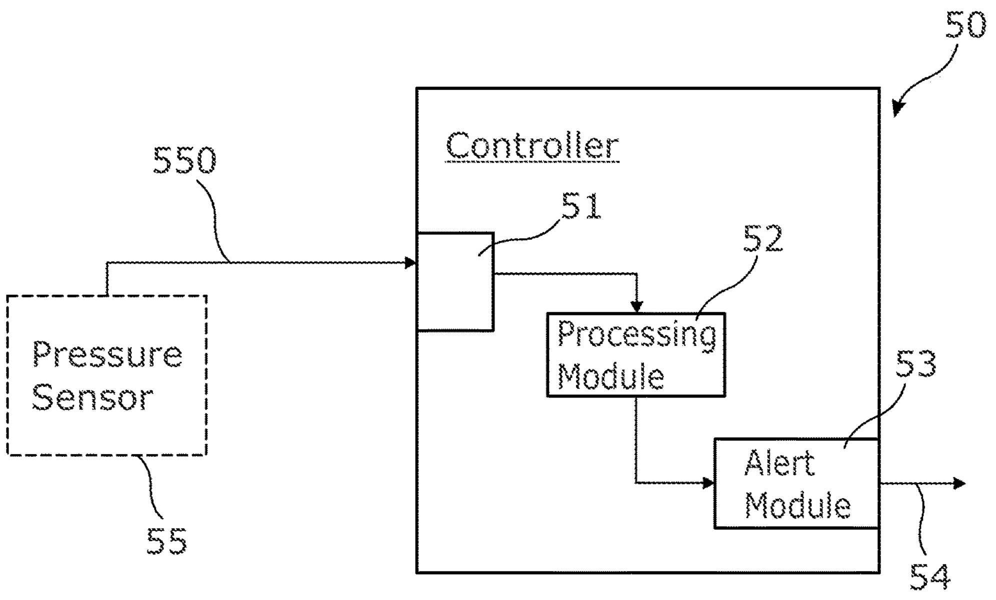
FIG. 5 illustrates a flowchart according to some examples.

FIG. 5 shows an example of a controller 50 for implementing any of the above-mentioned examples.

The controller 50 to monitor a printing fluid associated with a printing fluid supply channel of a printer comprises an input 51 to receive a pressure signal 550 from a pressure sensor 55, the signal being indicative of printing fluid pressure associated with the printing fluid supply channel. Further, the controller comprises a processing module 52 to determine from a characteristic of the pressure signal 550 a printing fluid abnormality. Also, the controller comprises an alert module 53 for issuing an alert 54 indicative of the printing fluid abnormality.

In an example, the processing module 52 is to determine based on the pressure signal 550 if an abnormality is present in the printing fluid. In an example, the controller 50 may also include a pump consumption input and such input may also be profided to the processing module 52 so that, based on the pressure signal and the energy-consumption signal of the pump, the processing module may determine the presence of an abnormality and communicate the alert module 53 accordingly.

Examples of alerts 54 issued by the alert module include and are not limited to: an enriched printing fluid alert or a detection of gas in the printing fluid.

The controller 50 may be any combination of hardware and programming to implement the functionalities described herein. These combinations of hardware and programming may be implemented in a number of different ways. In certain implementations, the programming for the controller 50, and its component parts, may be in the form of processor executable instructions stored on at least one non-transitory machine-readable storage medium and the hardware for the engines may include at least one processing resource to execute those instructions. The processing resource may form part of a printing device within the printing system, or a computing device that is communicatively coupled to the printing device. In some implementations, the hardware may include electronic circuitry to at least partially implement the controller 50. For example, the controller 50 may comprise an application-specific integrated circuit that forms part of a printing system.

Example implementations can be realised in the form of machine executable instructions arranged, when executed by a machine, to implement any or all aspects, processes, activities or flowcharts, taken jointly and severally in any and all permutations, described or claimed in this application. Therefore, implementations also provide machine-readable storage storing such machine instructions executed or implemented by a machine. The machine-readable storage can comprise non-transitory machine-readable storage. The machine can comprise one or more processors or other circuitry for executing or implementing the instructions. For example, the controller 50 can process any such machine executable instructions. The processing module 52 can be realised using such instructions.

Figure 6:
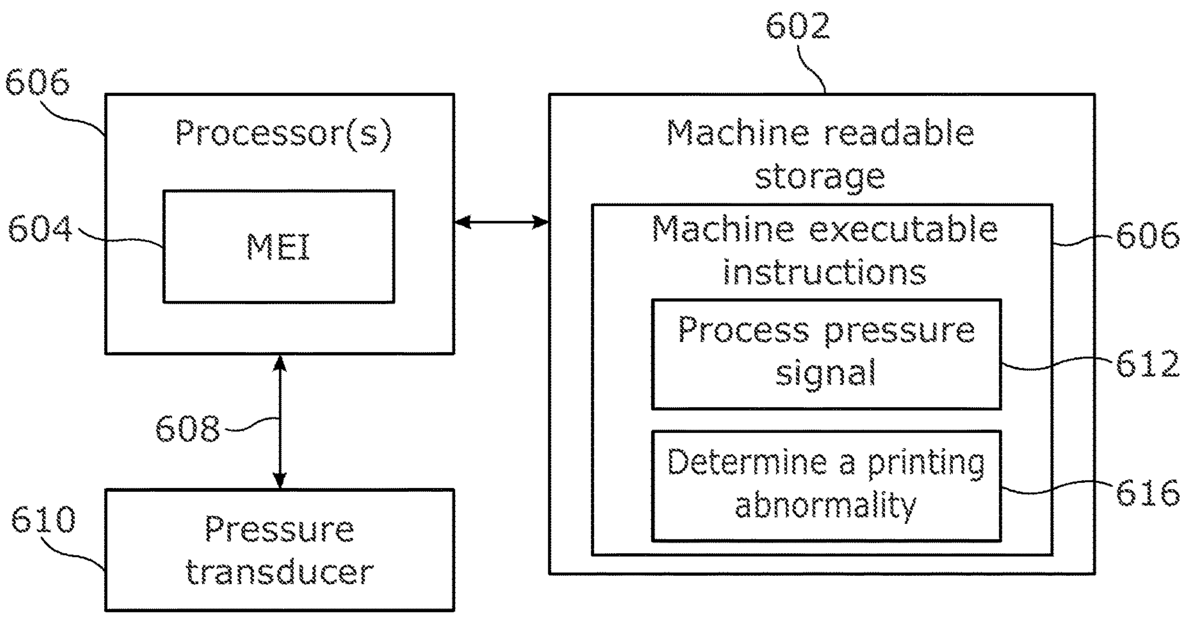
FIG. 6 shows machine-readable storage and machine executable instructions according to some examples.

Therefore, referring to FIG. 6, there is shown a view of implementations of at least one of machine executable, or machine implemented, instructions or machine-readable storage. FIG. 6 shows machine-readable storage 602. The machine-readable storage 602 can be realised using any type of volatile or non-volatile storage such as, for example, memory, a ROM, RAM, EEPROM, optical storage and the like. The machine-readable storage 602 can be transitory or non-transitory. The machine-readable storage 602 stores or implements machine executable, or machined implemented, instructions (MEIs) 604. The MEIs 604 comprise instructions that are executable, processed, interpreted or implemented, by a processor or other instruction execution circuitry 606. The processor or other circuitry 606 is responsive to executing the MEIs 604 to perform any and all activities, operations, methods described and claimed in this application. The processor or other circuitry 606 is an example of the above-described controller 118.

The processing module or other circuitry 606 can receive one or more than one signal 608 for determining a printing fluid abnormality in one or more than one respective printing fluid supply channel. The signal 608 is an example of any of the above described signals 136. The signal 608 is output by a respective transducer 610. The transducer 610 is an example of any of the above described transducers.

The controller can be an implementation of the foregoing processor or other circuitry 606 for executing any such MEIs 604.

The MEIs 604 can comprise instructions for realising a controller, printer or to implement any method described and/or claimed in this application.

Any and all example implementations can be realised with or within a printing system such as the printer described with reference to FIG. 1. The printer can be a multipass printer that is capable of printing at least one, or both, of bidirectionally or unidirectionally.

Although the above implementations have been described within a TIJ printing context, example implementations are not limited to such a technology. Any and all example implementations can be used for controlling printheads realised using technology other than TIJ technology such as, for example, piezoelectric printheads.

It will be appreciated that example implementations can be realised using page-wide printheads. Some printers have one or more than one printhead that spans the medium to be printed, that is, some printer have one or more than one page-wide printhead. Such printers are known as page-wide array printers. Page-wide array printers can have static printheads, that is, the carriage bearing the printheads does not traverse the medium rather the medium moves relative to the one or more than one printhead. It will be appreciated that some page-wide printers use multiple printheads to space the full width of the printer and other printers use a single printhead with an array of nozzles to space the full width of the printer.

Throughout the description and claims of this application, the words “comprise” and “contain” and variations of them mean “including but not limited to”, and they are not intended to (and do not) exclude other components or integers. Throughout the description and claims of this application, the singular encompasses the plural unless the context otherwise dictates. Where the indefinite article is used, the specification is to be understood as contemplating the plural as well as the singular, unless the context requires dictates.

Although example implementations have been described with reference to 2D printers, examples are not limited to such an arrangement. 3D printers use a variety of fluids in defining a 3D printed product. Example implementations can be realised in which the channels used to carry printing fluids used in 3D printers.

The invention claimed is:

1. A controller to monitor a printing fluid associated with a printing fluid supply channel of a printer; the controller comprising:

an input to receive a pressure signal by a pressure sensor; the signal being indicative of printing fluid pressure associated with the printing fluid supply channel;

a processing module to determine from a characteristic of the pressure signal a printing fluid abnormality, wherein the characteristic comprises a rate of change of printing fluid with time; and an alert module for issuing an alert indicative of the printing fluid abnormality, wherein the rate of change of printing fluid pressure with time below a predetermined gradient is indicative of the presence of gas within the printing fluid supply channel and, therefore, the alert corresponds to a presence of gas alert and the rate of change of printing fluid pressure with time above a further predetermined gradient is indicative of the presence of enriched printing fluid within the ink supply channel and, therefore, the alert corresponds to an enriched printing fluid alert.

2. The controller of claim 1, wherein the characteristic further comprises one or more than one of:

a pressurization period, a predetermined printing fluid pressure threshold, and a printing fluid pressure profile of a number of possible printing fluid pressure profiles each associated with a respective printing fluid.

3. The controller of claim 1, wherein the controller comprises or has access to a memory comprising a threshold characteristic wherein the controller is to compare the characteristic with the threshold characteristic and to determine the printing fluid abnormality based on the comparison.

4. The controller of claim 1, comprising a further input to receive an energy-consumption signal of a pump associated to the printing fluid supply channel wherein the processing module is to determine, from the characteristic and the energy-consumption signal, the printing fluid abnormality.

5. A non-transitory machine-readable storage storing machine instructions arranged when executed or implemented in a controller to:

receive a pressure signal derived from a pressure transducer;

the pressure signal being associated with a printing fluid pressure within a printing fluid delivery system;

process the received pressure signal to determine from a characteristic of the pressure signal a printing fluid abnormality, wherein the characteristic comprises a rate of change of printing fluid with time; and issuing an alert indicative of the printing fluid abnormality, wherein the rate of change of printing fluid pressure with time below a predetermined gradient is indicative of the presence of gas within the printing fluid supply channel and, therefore, the alert corresponds to a presence of gas alert and the rate of change of printing fluid pressure with time above a further predetermined gradient is indicative of the presence of enriched printing fluid within the ink supply channel and, therefore, the alert corresponds to an enriched printing fluid alert.

6. The non-transitory machine-readable storage of claim 5, in which the instructions to process the received pressure signal to determine the printing fluid abnormality comprise instructions to determine from another feature of the pressure signal output by the transducer the printing fluid abnormality.

7. The non-transitory machine-readable storage of claim 5, in which the instructions to process the received pressure signal to determine the printing fluid abnormality comprise instructions to determine variability of pressure with time, and instructions to determine from the variability of pressure the printing fluid abnormality.

8. The non-transitory machine-readable storage of claim 7, in which the instructions to process the received pressure signal to determine the printing fluid abnormality comprise: instructions to determine a pressure profile of the pressure signal, and instructions to compare the pressure profile of the pressure signal with a predefined pressure profile.

9. The non-transitory machine-readable storage of claim 5, comprising instructions arranged to measure a pressure reading associated with the pressure transducer an elapsed period of time from an event.

10. A printing system comprising a printhead, a printing fluid delivery system for transporting printing fluid to the printhead from a printing fluid supply, a pressure transducer for determining a printing fluid pressure, a controller arranged to determine from a characteristic of an output signal associated with the pressure transducer a printing fluid abnormality within the printing fluid delivery system, wherein the characteristic comprises a rate of change of printing fluid with time, and the controller causes an issuance of an alert indicative of the printing fluid abnormality, wherein the rate of change of printing fluid pressure with time below a predetermined gradient is indicative of the presence of gas within the printing fluid supply channel and, therefore, the alert corresponds to a presence of gas alert and the rate of change of printing fluid pressure with time above a further predetermined gradient is indicative of the presence of enriched printing fluid within the ink supply channel and, therefore, the alert corresponds to an enriched printing fluid alert.

11. The printing system of claim 10, in which the characteristic further comprises one or more of a pressurization period, a maximum printing fluid pressure, and an ink pressure profile of a number of possible printing fluid pressure profiles each associated with a respective printing fluid.

12. The printing system of claim 11 further comprising a memory comprising a threshold characteristic selected from a threshold rate of change of printing fluid pressure with time and at least one of:

a predetermined printing fluid maximum pressure threshold; and a printing fluid pressure profile is stored and wherein the controller is to compare the characteristic with the threshold characteristic and to determine the printing fluid abnormality based on the comparison.

13. The printing system of claim 10 further comprising a pump to maintain a determined printing fluid flow in the printing fluid delivery system, wherein the controller is to receive an energy-consumption signal associated to the pump and wherein the controller is to determine the printing fluid abnormality based on the output signal and the energy-consumption signal.

* * * * *